United States Patent [19]
Sagi et al.

[11] 3,881,399
[45] May 6, 1975

[54] STEAM ENGINE WITH IMPROVE INLET VALVE ARRANGEMENT

[75] Inventors: Charles J. Sagi, Rochester; Charles A. Amann, Bloomfield Hills, both of Mich.

[73] Assignee: General Motors Corporation, Detroit, Mich.

[22] Filed: Apr. 29, 1970

[21] Appl. No.: 32,815

[52] U.S. Cl. .................. 91/325; 91/187; 91/188; 91/410
[51] Int. Cl. ............................................ F01l 31/08
[58] Field of Search ............ 91/187, 188, 183, 325, 91/410; 123/90.6

[56] References Cited
UNITED STATES PATENTS

| | | | |
|---|---|---|---|
| 1,254,840 | 1/1918 | Nacker | 123/90.6 X |
| 1,635,304 | 7/1927 | Baster | 123/90.6 X |
| 2,042,967 | 6/1936 | Russell | 123/90.6 X |
| 2,075,069 | 3/1937 | Titus et al. | 91/183 |
| 2,094,159 | 9/1937 | Mueller | 91/187 X |
| 2,113,936 | 4/1938 | Fickett et al. | 91/188 X |
| 2,690,165 | 9/1954 | Harris et al. | 91/187 |

Primary Examiner—Irwin C. Cohen
Attorney, Agent, or Firm—Robert J. Outland

[57] ABSTRACT

A piston type steam engine expander of the high speed, variable speed type having a poppet steam inlet valve and cylinder outlet ports and operable over a wide speed range on a throttled steam supply includes valve mechanism arranged to actuate the inlet valve through a fixed lift curve which provides a substantial change in effective steam cutoff at various speeds, as well as providing advantageous valve opening characteristics. Operating advantages similar to those of variable opening and closing inlet valves are provided by the use of a long valve open period including early opening and late closing of the valve, combined with unusually slow valve motion in the early stages of opening and the final stages of closing.

4 Claims, 5 Drawing Figures

INVENTORS
Charles J. Sagi &
Charles A. Amann
BY
Robert J. Outland
ATTORNEY

INVENTORS
Charles J. Sagi &
BY Charles A. Amann
Robert J. Outland
ATTORNEY

STEAM ENGINE WITH IMPROVE INLET VALVE ARRANGEMENT

BACKGROUND OF THE INVENTION

This invention relates to steam engines and more particularly to advantageous fixed curve inlet valve opening arrangements for piston type throttled steam expanders operable with large speed variations and high maximum speeds.

When a steam engine is intended for operation at substantially varying speeds with varying steam pressures, it is known to provide a cylinder steam inlet valve in which the time of opening and/or closing may be varied so as to obtain desirable operating characteristics. For example, early opening is desirable at high speeds to permit the steam pressure in the cylinder to reach the inlet pressure as early as possible after the piston reaches top dead center. A later valve opening is desirable when operating at lower speeds and reduced throttle to prevent formation of a negative work loop with resultant reverse torque oscillations and reduced efficiency. At high speeds an early valve closing is desirable to obtain maximum efficiency through a long expansion stroke. However, at low speeds it is desirable to have a later valve closing when operating at high steam pressure in order to permit the greatest possible output torque with a reduced steam expansion ratio.

SUMMARY OF THE INVENTION

The present invention provides a piston type steam engine expander utilizing a poppet type inlet valve and cylinder outlet ports in which the above enumerated advantages of variable opening and closing steam inlet valves are provided by the use of simpler valve actuating mechanism providing a valve lift curve which is fixed with respect to the motion of the engine piston and the angular positions of the crankshaft. The arrangement includes the use of a relatively long valve open period extending from about 25° or more before the piston top dead center position to about 60° or more after piston top dead center. Also included is the use of very slow rates of valve motion during the early stages of valve opening and the late stages of valve closing.

The arrangement of the present invention is especially intended for and particularly advantageous in a steam engine expander designed for use in an automotive vehicle where limited space and desired low cost make the complications of variable valve opening and closing mechanisms undesirable. A substantial variation in engine operating speeds is necessary to realize the advantages of the arrangement. It is also necessary as a practical matter for the engine to be utilized so that it does not operate under load below a predetermined idling speed in order that a fixed valve lift curve may be practically used.

The manner and degree in which the advantages of the present invention may be obtained in practical engine designs, as well as further advantages and operating principles of the invention will be more thoroughly understood from the following description of a preferred embodiment, taken together with the accompanying drawings.

DESCRIPTION OF THE PREFERRED EMBODIMENT

Figure 1:
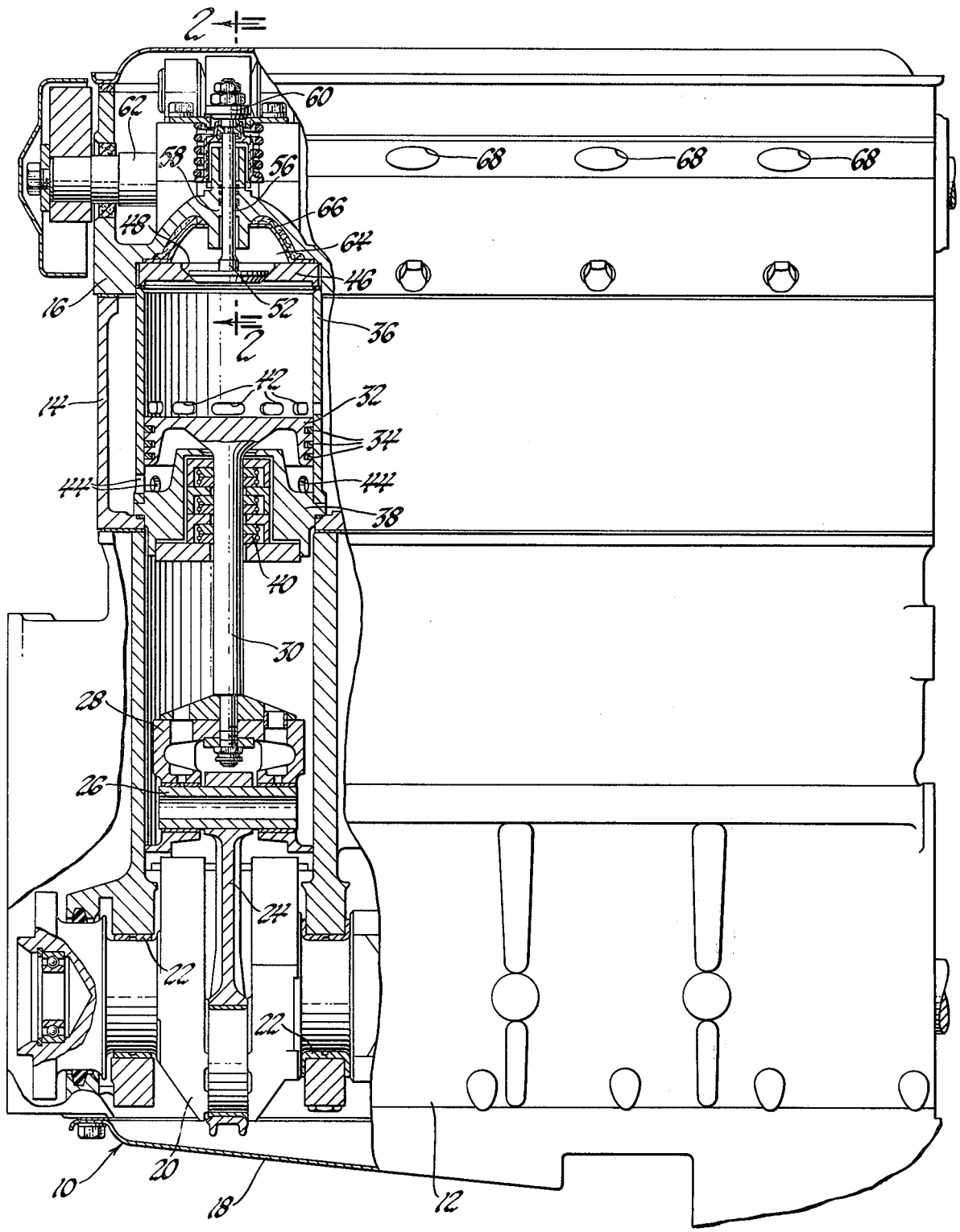
FIG. 1 is a side view of a four-cylinder piston type steam expander according to the present invention, having portions broken away to disclose the construction of the components relating to one of the cylinders.
Figure 2:
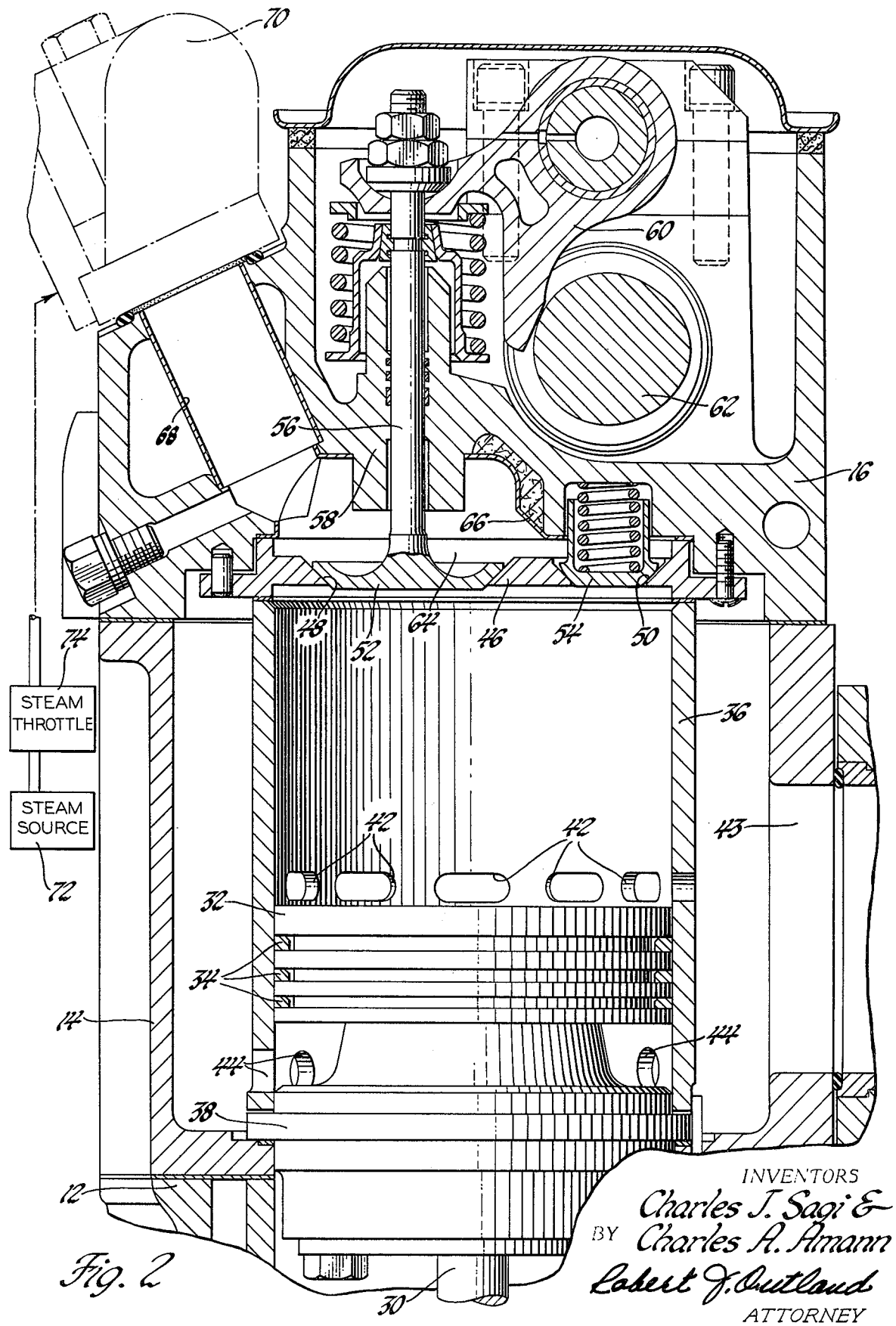
FIG. 2 is a fragmentary cross-sectional view taken generally in the plane indicated by the line 2—2 of FIG. 1 and showing additional details of the cylinder and inlet valve mechanism construction.

Referring first to FIG. 1 of the drawings, numeral 10 generally indicates a piston type steam engine expander formed according to the invention and including a crankcase 12 supporting a cylinder box 14 to which is secured a cylinder head 16.

Crankcase 12 is closed at the bottom by an oil pan 18 and supports a crankshaft 20 rotatably journaled on conventional sleeve bearings 22. A plurality of connecting rods 24, only one being shown, connect the throws of crankshaft 20 with the wrist pins 26 of crossheads 28 reciprocably mounted in the upper portion of crankcase 12. Piston rods 30 respectively connect the crossheads 28 with pistons 32. The pistons each carry piston rings 34 that sealingly engage the walls of their respective cylinders 36, retained within the cylinder box 14.

Seal retainers 38, each carrying a seal member 40, are mounted in the cylinder box 14 so as to seal the piston rods 30 against leakage of steam or water into the crankcase. Cylinders 36 include exhaust ports 42 which are uncovered when piston 32 is at its lower dead center position to permit the escape of steam through exhaust passage 43. Drain openings 44 are also provided to permit the escape of steam and water which leaks past the piston rings 34.

Cylinder head 16 retains a plurality of valve plates 46 which sealingly engage the upper ends of the cylinders 36 so as to form end walls thereof. The valve plates include steam inlet and relief openings 48, 50 which are respectively closed by inlet poppet valves 52 and spring loaded relief valves 54. Valves 52 include stems 56 which are received within valve guides 58 formed as part of the cylinder head 16. The valve stems 56 are engaged by rocker arms 60 which are pivotally carried in the cylinder head. The rocker arms are, in turn, actuatingly engaged by the cams of the camshaft 62 rotatably supported by the cylinder head and driven by the crankshaft through suitable drive means (not shown).

Between each valve plate 46 and the cylinder head 16 there is defined a steam inlet chamber 64, the cylinder head surface of which may be insulated as at 66 to reduce the transfer of heat to the valve gear and lubricant. Tubular members 68 define steam inlet passages which respectively connect each steam inlet chamber with an inlet fitting 70. Fitting 70 is, in turn, connected to a source 72 of pressurized steam, delivery of which is controlled by suitable throttle means 74.

In operation, steam at a predetermined constant pressure is supplied by steam source 72 and is delivered at pressures controlled by steam throttle 74 to the various steam inlet chambers 64 of the engine. When the inlet valves 52 of the respective cylinders are opened, the steam is admitted to the cylinders, forcing the respective pistons 32 downwardly and turning the crankshaft 20. When the pistons approach their bottom center positions, ports 42 are uncovered, permitting the expanded steam in the cylinders to escape and to be exhausted from the engine.

The actuation of the inlet valve 52, including the timing and rate of opening and closing, is controlled by the valve gear, including rocker arms 60 and camshaft 62. The present invention, as will be subsequently more fully described, is primarily directed to the advantageous manner of actuating the steam inlet valves in order to provide operating advantages under varying engine speeds and steam throttle settings. These advantages are obtained with a simple valve actuating mechanism providing a fixed valve lift curve which remains the same under all operating conditions of the engine, thus avoiding the complications of additional devices for modifying the opening and closing times of the inlet valve.

An actual engine of the type described was installed and operated in an automobile where it, in essence, took the place of the usual internal combustion engine, driving the vehicle through an automatic transmission. The engine also provided a source of power for various accessories, such as an alternating current generator and an air conditioning compressor by means of a power takeoff drive. To satisfactorily operate in this application, the engine was designed for a maximum speed of 3200 rpm, substantially higher than the usual steam engines of the past. In addition, an idle speed of 640 rpm was established so as to provide continuous power for the accessories, as well as to fix a minimum operating speed under load to which the engine would be subjected.

Figure 3:
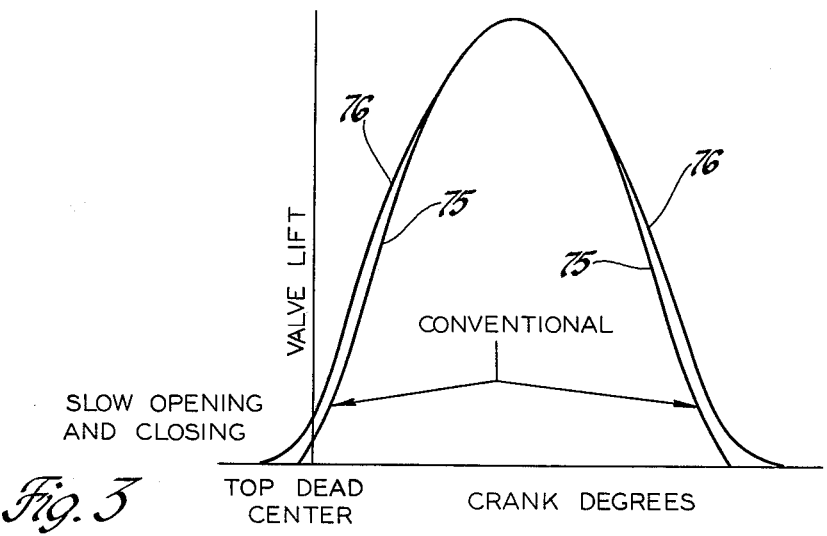
FIG. 3 is a graph comparing the valve lift curve provided by the present invention with that of a more conventional engine.

The foregoing characteristics made possible the use of a steam inlet valve actuating mechanism having a fixed valve opening curve of novel design as shown in FIG. 3. In this figure, numeral 75 designates a steam inlet valve lift curve corresponding generally to conventional practice which contemplates opening and closing the inlet valve as quickly as possible. Numeral 76 designates the steam inlet valve lift curve of the present invention which is seen to involve an extension of both the mechanical opening and closing periods of the valve with very slow rates of valve lift utilized in the initial stages of opening and the terminal stages of closing the valve.

In the engine first constructed, the diameter of the steam inlet valve was 1½ inches and a maximum valve lift of 0.1019 inches was provided. The total opening and closing event of the inlet valve occupied 86° of crankshaft rotation which was evenly divided between opening and closing periods. The beginning of opening of the valve occurred 27° before the piston top dead center position, while the termination of the valve closing motion occurred at 59° after piston top center.

An indication of the slow rate of beginning opening and ending closing of the valve is apparent from the fact that an initial valve opening of 0.0041 inches, about 4% of the maximum lift, requires a crankshaft rotation of about 7.2° which is nearly 8.4% of the total valve opening and closing event and, consequently, nearly 17% of the period during which the valve is opening. In addition, a 5% lift of 0.005095 inches requires about 8.2° or about 9.5% of the 86° total valve opening and closing event. Thereafter, valve lift is much more rapid so that the valve is 10% open at about 12.9% of the total event and is 20% open at about 17.2% of the total event. It is also, of course, 100% open at 50% of the total event.

The valve closing curve is the reverse of the valve opening curve so that a relatively rapid rate of valve closing is followed which is slowed as the valve reaches an opening of about 5% of the maximum lift after which the closing rate is relatively slow, occupying about 9.5% of the total opening and closing event for the final 5% of valve closing motion. Other figures for the valve closing period are, in like manner, equal to the comparable figures for the valve opening period.

An alternative valve arrangement has also been designed primarily to reduce forces on the valve gear, but which also gives slightly improved characteristics. This arrangement uses a smaller inlet valve of ⅞ inch diameter with a higher maximum valve lift of 0.109 inches. The total opening and closing event is increased somewhat also to occupy 94° of crankshaft rotation, equally divided between opening and closing periods.

With this arrangement, a 4% lift of 0.0043 inches requires approximately 8° or about 8½% of the total valve opening and closing event. A 5% lift of 0.00545 inches requires 8.8° of crankshaft rotation or approximately 9.4% of the total opening and closing event. Again, the rate is increased thereafter so that the valve is 10% open at about 13% of the total valve event and 20% open at about 17.2% of the total event, the percentage figures being about the same as for the 1½ inch diameter valve. In like manner, valve closing follows on identical curve in the reverse direction.

It is thus seen that the valve curve characteristics in both cases may be described as slow opening and closing and are best characterized by the percentage of the total event which is required to make an initial valve opening of 4 or 5% and to make the final valve closing of 4 or 5%.

Figure 4:
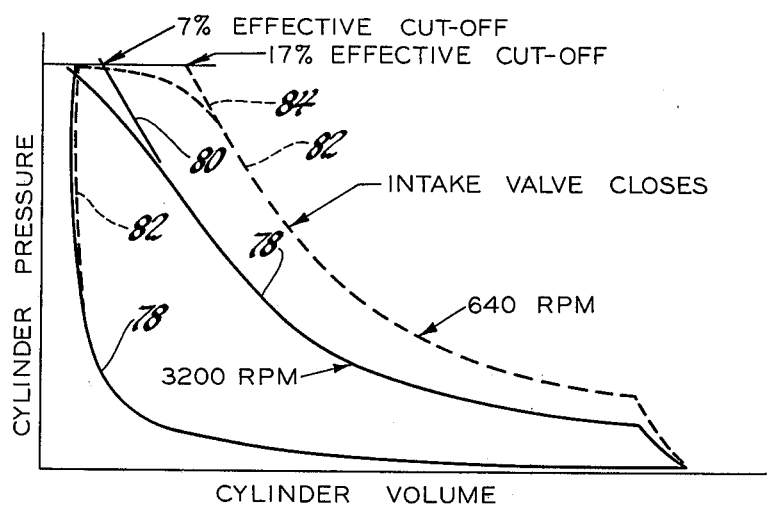
FIG. 4 is a graph of comparative full throttle cylinder pressure-volume diagrams at the high and low operating speeds of the engine to illustrate the variation in effective cutoff provided.

The effects of the ⅞ inch valve lift curve are best described by reference to FIGS. 4 and 5 of the drawings. FIG. 4 shows two pressure-volume diagrams calculated for full throttle operation at the maximum and minimum engine operating speeds. The solid closed curve 78 represents operation at 3200 rpm. A solid line 80 is shown extending the upper portion of the expansion portion of the curve back to its theoretical intersection with the inlet steam pressure line. The intersection indicates an effective steam cutoff point of 7% of the piston stroke, showing very efficient use of steam in engine operation at the high speed full load point.

As engine speed decreases, the slow valve closing rate permits a good deal more steam to enter the cylinder at a later point in the cycle. Thus, there results the dashed pressure-volume curve 82 which is based on full throttle operation at 640 rpm. A dashed line 84, extending the expansion portion of the diagram to the high pressure line, shows an effective steam cutoff of 17%, substantially later than that obtained during high speed operation. This later effective cutoff gives a desired increase in the engine torque output at low speeds with some sacrifice in efficiency.

The reason for such a substantial change in effective cutoff points at the different operating speeds is largely attributable to the slow valve closing motion of the present invention. When operating at high speeds, the small lift of the valve during the last portion of its closing motion is not great enough to permit very much steam to enter the cylinder. Consequently, the effective cutoff is advanced as shown in the solid curve 78 of FIG. 4. However, when the engine speed is significantly lower, as at the idle speed of 640 rpm, a much greater amount of steam is able to enter the cylinder through the slightly open valve during the extended slow closing portion of its closing motion. In this way the effective cutoff is significantly retarded, as shown in dashed curve 82, and a substantial charge in torque characteristics is obtained.

Figure 5:
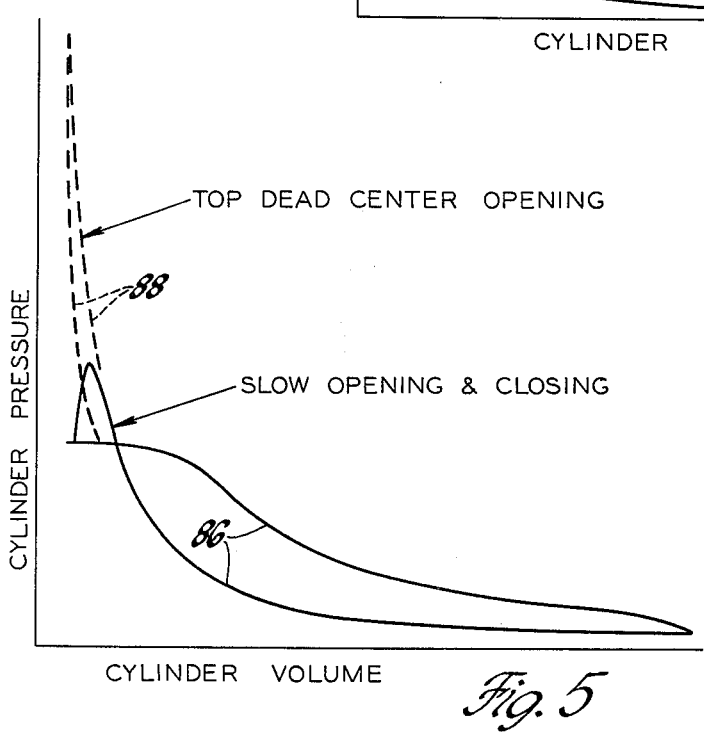
FIG. 5 is a reduced throttle pressure-volume diagram comparing the reduced negative work loop of the present invention with that which would result from a later opening time of the inlet valve.

The effect of the slow valve opening motion is shown diagramatically in FIG. 5. Here, the solid curve 86 represents the pressure-volume diagram of a cylinder when the engine is operating at slow speed and reduced throttle. Under this condition, it is noted that as the piston moves upwardly, it closes off the exhaust ports 42. Thereafter, the remaining steam in the cylinder is compressed, increasing the cylinder pressure until the piston reaches a point where the inlet valve is opened. When the engine operates on reduced steam pressure, the cylinder compression pressure may become significantly higher than the inlet steam pressure. The dashed line 88 of the figure indicates the reverse work loop which would be formed if the inlet valve were not to be opened until the top center position of the piston. In such a case, cylinder pressures would rise much higher than the inlet steam pressure at reduced throttle and would only be reduced by the escape of steam from the cylinder upon opening of the inlet valve. The formation of this negative work loop would cause significant torque reversals in the engine and drive line with consequent oscillations that could damage components and adversely affect the smoothness of the vehicle ride. It would also cause a substantial loss in engine efficiency at lower operating speeds. Accordingly, it is desirable to avoid or minimize such negative work loops.

In the present engine the negative work loop is substantially reduced, as indicated by curve 86, through the use of the early valve opening characteristic. At the slow speeds normally attained with reduced steam pressure, the slow early valve opening permits the escape of pressure from the cylinder as it is building up and thus prevents cylinder pressures from becoming much greater than the inlet steam pressure, thereby increasing the part throttle low speed efficiency of the engine.

With conventional design, high speed operation at full steam pressure would not permit the use of such an early valve opening point as chosen for this engine without a reduction of efficiency, since the maximum steam pressure would be reached well in advance of the top center position of the piston. Here the slow opening curve of the present invention is used to advantage, since it provides a limited time and area of valve opening so that, at higher engine speeds, sufficient steam is not permitted to enter the cylinder to reach maximum steam pressures before the piston top center position. In this way, high efficiency is maintained at full throttle high operating speeds while advantageous reduction in the negative work loop is obtained at part throttle lower operating speeds.

While the invention has been described by reference to a preferred embodiment chosen for purposes of illustration, it should be apparent that numerous changes could be made within the scope of the inventive concept disclosed.

We claim:

1. A steam engine expander of the type having a cylinder, a piston movable in said cylinder and connected with a crank mechanism for the delivery of power, a steam inlet opening in a wall of said cylinder and connecting said cylinder with a throttled supply of steam for operation of said engine over a varied speed range, a poppet inlet valve adapted to close said opening and movable between open and closed positions, and valve actuating mechanism operable to open and close said valve on a predetermined lift curve fixed with respect to the engine piston motion and the respective angular positions of the crank mechanism, said valve mechanism being arranged to require a crank angle change of at least 18% of the total crank angular movement during the valve closing period to move the valve through the final 5% of its closing motion.

2. A steam engine expander of the type having a cylinder, a piston movable in said cylinder and connected with a crank mechanism for the delivery of power, a steam inlet opening in a wall of said cylinder and connecting said cylinder with a throttled supply of steam for operation of said engine over a varied speed range, a poppet inlet valve adapted to close said opening and movable between open and closed positions, and valve actuating mechanism operable to open and close said valve on a predetermined lift curve fixed with respect to the engine piston motion and the respective angular positions of the crank mechanism, said valve mechanism being arranged to maintain said valve open until at least about 60° after the piston top center position and to require a crank angle change of at least 18% of the total crank angular movement during the valve closing period to move the valve through the final 5% of its closing motion.

3. A steam engine expander of the type having a cylinder, a piston movable in said cylinder and connected with a crank mechanism for the delivery of power, a steam inlet opening in a wall of said cylinder and connecting said cylinder with a throttled supply of steam for operation of said engine over a varied speed range, a poppet inlet valve adapted to close said opening and movable between open and closed positions, and valve actuating mechanism operable to open and close said valve on a predetermined lift curve fixed with respect to the engine piston motion and the respective angular positions of the crank mechanism, said valve mechanism being arranged to begin valve opening not less than about 25° before the piston top center position and to require a crank angle change of at least 18% of the total crank angular movement during the valve opening period to move the valve through the initial 5% of its opening motion.

4. A steam engine expander of the type having a cylinder, a piston movable in said cylinder and connected with a crank mechanism for the delivery of power, a steam inlet opening in a wall of said cylinder and connecting said cylinder with a throttled supply of steam for operation of said engine over a varied speed range, a poppet inlet valve adapted to close said opening and movable between open and closed positions, and valve actuating mechanism operable to open and close said valve on a predetermined lift curve fixed with respect to the engine piston motion and the respective angular positions of the crank mechanism, said valve mechanism being arranged to begin valve opening not less than about 25° before the piston top center position, to complete valve closing not less than about 60° after the piston top center position and to provide a valve lift curve in which at least 9% of the angular crank motion during which the valve is open is required to move the valve through the initial 5% of its opening motion, as well as through the final 5% of its closing motion.

* * * * *